(12) United States Patent
Botura et al.

(10) Patent No.: US 11,618,575 B2
(45) Date of Patent: Apr. 4, 2023

(54) ICE DETECTOR APPARATUS, SYSTEM, AND METHOD

(71) Applicant: GOODRICH CORPORATION, Charlotte, NC (US)

(72) Inventors: Galdemir Cezar Botura, Akron, OH (US); James A Mullen, Wadsworth, OH (US)

(73) Assignee: Goodrich Corporation, Charlotte, NC (US)

( * ) Notice: Subject to any disclaimer, the term of this patent is extended or adjusted under 35 U.S.C. 154(b) by 936 days.

(21) Appl. No.: 16/509,078

(22) Filed: Jul. 11, 2019

(65) Prior Publication Data
US 2021/0009273 A1    Jan. 14, 2021

(51) Int. Cl.
*B64D 15/12*    (2006.01)
*H05B 3/14*    (2006.01)
(Continued)

(52) U.S. Cl.
CPC ............ *B64D 15/12* (2013.01); *H05B 3/146* (2013.01); *H05B 3/34* (2013.01); *H05B 3/48* (2013.01); *H05B 2203/013* (2013.01)

(58) Field of Classification Search
CPC .. B64D 15/12; B64D 15/20; B64D 2045/009; B64G 1/58; B64G 1/50; H05B 3/0014; H05B 3/145; H05B 3/34; H05B 3/342; H05B 3/345; H05B 3/347; H05B 3/0042; H05B 3/0023; H05B 3/18; H05B 3/146; H05B 3/48; H05B 2203/011; H05B 2203/017; H05B 2203/002; H05B 2203/003; H05B 2203/004; H05B 2203/01; H05B 2203/013; H05B 2203/036; H05B 2203/035; H05B 2214/04; H05B 2214/02
See application file for complete search history.

(56) References Cited

U.S. PATENT DOCUMENTS 9,511,871 B2 * 12/2016 Steinwandel ............ H05B 3/18
10,071,808 B1    9/2018 Bosetti et al.
(Continued)

FOREIGN PATENT DOCUMENTS

EP    2943404    * 11/2015
GB    2589368 A    * 6/2021    ............ B64D 15/12
WO    2014108695    7/2014

OTHER PUBLICATIONS

European Patent Office, European Search Report dated Aug. 7, 2020 in Application No. 19216324.4.

*Primary Examiner* — Shawntina T Fuqua
(74) *Attorney, Agent, or Firm* — Snell & Wilmer L.L.P.

(57) ABSTRACT

An ice detector apparatus for an aircraft includes a heater strip and a temperature sensor. The heater strip is configured to be mounted to an external surface of an aircraft and the temperature sensor is coupled to the heater strip. The temperature sensor is configured to detect a temperature profile of the heater strip, wherein the temperature profile is indicative of an extent of icing. The temperature profile may be indicative of whether the aircraft is operating in an appendix C icing-envelope or an appendix O icing-envelope. The temperature sensor may include a plurality of temperature sensors coupled along a length of the heater strip, such that the temperature profile comprises a spatial temperature map of the heater strip.

17 Claims, 5 Drawing Sheets

(51) Int. Cl.
*H05B 3/34* (2006.01)
*H05B 3/48* (2006.01)

(56) References Cited

U.S. PATENT DOCUMENTS

| | | |
|---|---|---|
| 10,155,373 B2 | 12/2018 | Nino et al. |
| 2013/0327756 A1* | 12/2013 | Clemen, Jr. ............ B64D 15/12 |
| | | 219/202 |
| 2016/0221680 A1* | 8/2016 | Burton .................... H05B 3/34 |
| 2018/0215476 A1* | 8/2018 | Chee ........................ C09D 7/65 |
| 2019/0202568 A1* | 7/2019 | Borup ................... B64C 39/024 |

* cited by examiner

ICE DETECTOR APPARATUS, SYSTEM, AND METHOD

FIELD

The present disclosure relates generally to ice detection systems and methods, and more specifically to an ice detector apparatus, system, and method for detecting and distinguishing different icing conditions.

BACKGROUND

Icing on aircraft and other vehicles, structures, and systems, is a hazardous safety concern. For example, governmental agencies, such as the Federal Aviation Administration ("FAA") in the United States of America and the European Aviation Safety Agency ("EASA") in Europe, often establish rules and safety requirements that relate to icing on aircraft. Continuing the example, the FAA issues rules pertaining to icing conditions on aircraft, referred to conventionally as "appendix C icing conditions" (see FAA CFR 14 Part 25). The FAA has recently issued heightened rules, at least for certain types of aircraft, pertaining to conditions in which specific water content and altitudes in the atmosphere result in the formation of "supercooled large droplets (SLD)." These conditions, which are not covered by appendix C icing conditions, are referred to as appendix O icing conditions. Conventional ice detection and/or de-icing systems and methods are unable to differentiate the appendix C icing conditions from the appendix O icing conditions, and thus aircraft may have insufficient de-icing protocols to handle appendix O icing conditions, thus resulting in potential safety concerns.

SUMMARY

In various embodiments, the present disclosure provides an ice detector apparatus (e.g., for an aircraft). The ice detector apparatus may include a heater strip and a temperature sensor. The heater strip may be configured to be mounted to a surface (e.g., an internal or external surface of an aircraft). The temperature sensor may be coupled to the heater strip, wherein the temperature sensor is configured to detect a temperature profile of the heater strip, wherein the temperature profile (e.g., a temperature signature) is indicative of and distinctive of an extent of icing.

In various embodiments, the temperature profile is indicative of whether the aircraft is operating in dry air, in an appendix C icing-envelope, or an appendix O icing-envelope. In various embodiments, the temperature sensor comprises a plurality of temperature sensors coupled along a length of the heater strip, wherein the temperature profile comprises a spatial temperature map of the heater strip. In various embodiments, the carbon allotrope heater comprises a carbon nanotube heater. In various embodiments, the temperature sensor comprises a resistance temperature detector. In various embodiments, the external surface is a leading edge of a structure of the aircraft, wherein the heater strip is configured to extend around the leading edge such that a first end of the heater strip is disposed on a first side of the structure and a second end of the heater strip is disposed on a second side of the structure, wherein the first side is opposite the second side and the first side meets the second side at the leading edge.

Also disclosed herein, according to various embodiments, is an aircraft comprising a heater strip mounted to an external surface of the aircraft and a temperature sensor coupled to the heater strip, wherein the temperature sensor is configured to detect a temperature profile, also referred to herein as a temperature signature, of the heater strip. The aircraft may further include a controller operably coupled in electronic communication with heater strip and the temperature sensor, the controller comprising a processor. In various embodiments, a tangible, non-transitory memory is configured to communicate with the processor, wherein the tangible, non-transitory memory has instructions stored thereon that, in response to execution by the processor, cause the aircraft to perform various operations. The various operations may include determining, based on the temperature profile, whether the aircraft is in dry air, or whether a flight operating condition of the aircraft is in an appendix C icing-envelope or an appendix O icing-envelope.

In various embodiments, the operations further include, in response to determining the flight operating condition of the aircraft is in the appendix O icing-envelope, changing the flight operating condition to remove the aircraft from the appendix O icing-envelope. In various embodiments, the operations further comprise, in response to determining the flight operating condition of the aircraft is in the appendix O icing-envelope, actuating supplementary de-icing.

In various embodiments, the external surface of the aircraft is a leading edge of a structure of the aircraft. In various embodiments, the structure comprises at least one of a wing, a tail, a horizontal stabilizer, and an inlet engine case. In various embodiments, the heater strip extends around the leading edge such that a first end of the heater strip is disposed on a first side of the structure and a second end of the heater strip is disposed on a second side of the structure, wherein the first side is opposite the second side and the first side meets the second side at the leading edge. In various embodiments, the aircraft further includes at least one of an electrically insulative and a thermally insulative material disposed between the heater strip and the external surface of the aircraft.

Also disclosed herein, according to various embodiments, is an ice detection method of an aircraft. The method may include receiving, by a controller, a temperature profile from a temperature sensor coupled to a heater strip mounted to an external surface of the aircraft. The method may also include determining, by the controller and based on the temperature profile, whether a flight operating condition of the aircraft is in an appendix C icing-envelope or an appendix O icing-envelope. The method may further include, in response to determining the flight operating condition of the aircraft is in the appendix O icing-envelope, changing, by the controller, the flight operating condition to remove the aircraft from the appendix O icing-envelope. The method may include, in response to determining the flight operating condition of the aircraft is in the appendix O icing-envelope, actuating, by the controller, supplementary de-icing.

In various embodiments, the temperature sensor comprises a plurality of temperature sensors coupled along a length of the heater strip, wherein determining whether the flight operating condition of the aircraft is in dry air, in the appendix C icing-envelope, or the appendix O icing-envelope comprises determining, by the controller, a spatial temperature map of the heater strip. In various embodiments, determining the spatial temperature map of the heater strip comprises determining, by the controller, at least one of a size of water droplets in air around the aircraft and a water content of the air around the aircraft. In various embodiments, determining whether the flight operating condition of the aircraft is in the appendix C icing-envelope or the appendix O icing-envelope comprises determining, by the controller, a heat flux of the heater strip. In various embodiments, the method further includes controlling, by the controller, the heater strip.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, are apparatuses, systems, and methods for ice detection. More specifically, the present disclosure provides apparatuses, systems, and methods for detecting icing conditions and for facilitating distinguishing between different icing conditions. While numerous examples and details herein pertain to implementing the disclosed ice detection apparatus and system in conjunction with an aircraft (e.g., for improving flight safety by distinguishing between different icing conditions during flight), the ice detection apparatus, system, and method may be implemented with other structures and systems, such as other vehicles, buildings, bridges, wind turbines, power cables, etc.

Figure 1:
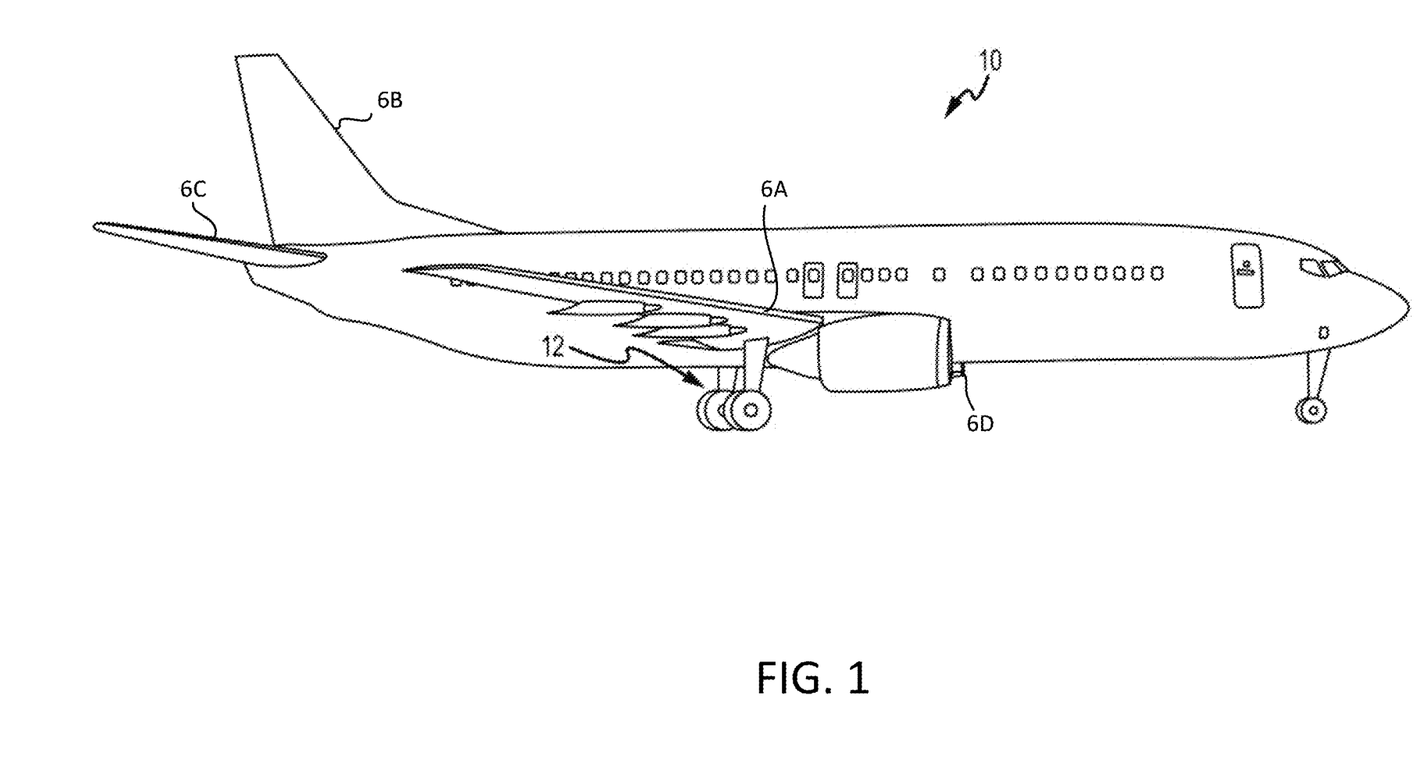
FIG. 1 illustrates an exemplary aircraft, in accordance with various embodiments.

Referring to FIG. 1, in accordance with various embodiments, an aircraft 10 is illustrated. The aircraft 10 may include a fuselage and various landing gear 12. Further, the aircraft 10 may include various structures that have a leading edge (i.e., a forward edge). For example, the aircraft 10 generally includes wings having a leading edge 6A, a tail/vertical stabilizer having a leading edge 6B, a horizontal stabilizer having a leading edge 6C, and/or an engine case inlet having a leading edge 6D, among others. As described in greater detail below, the ice detector apparatus provided herein is mounted to an external surface of the aircraft 10, and may be specifically mounted to a leading edge of the aircraft 10, according to various embodiments. In various embodiments, the ice detector comprises a strip on the suction side of the airfoil. That variance results in lower energy required to satisfy specific applications. In various embodiments, the ice detector apparatus may be mounted to an internal surface.

Figure 2:
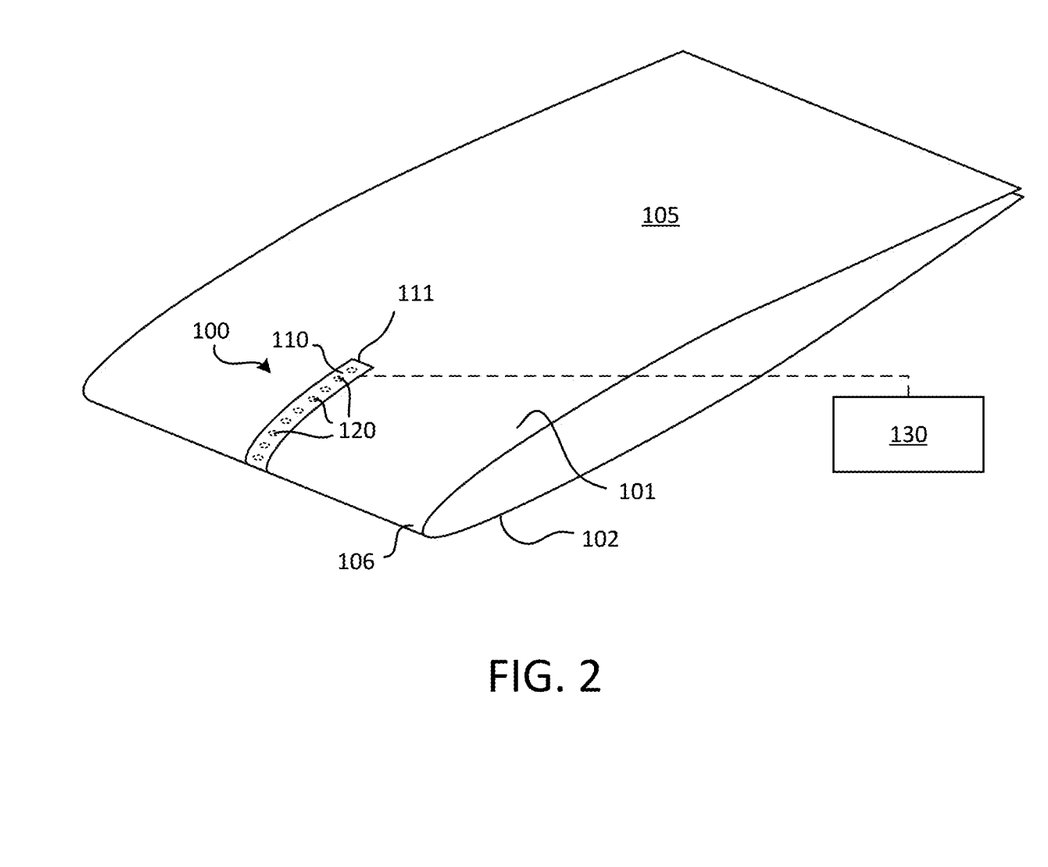
FIG. 2 illustrates an ice detector apparatus mounted to a structure, in accordance with various embodiments.

In various embodiments, and with reference to FIG. 2, an ice detector apparatus 100 includes a heater strip 110 and a temperature sensor 120. The heater strip 110 is generally configured to be mounted to an external surface 105 of an aircraft (e.g., to a structure of aircraft 10), according to various embodiments. The temperature sensor 120, which may be a plurality of temperature sensors 120, is coupled to the heater strip 110, according to various embodiments. Generally, the temperature sensor 120 is configured to detect a temperature profile of the heater strip 110, and the temperature profile is indicative of an icing condition of the aircraft, according to various embodiments. That is, the temperature profile detected by the one or more temperature sensors 120 may be indicative of the extent or degree of icing the aircraft is experiencing. For example, the determined temperature profile may be utilized, as described in greater detail below, to differentiate between different icing regimes and thus to determine whether the aircraft is operating in an appendix C icing-envelope or an appendix O icing-envelope. The appendix O icing-envelope refers to flight operating conditions that include the formation of "super large droplets" and/or that comprise air having an elevated water content that is susceptible to freezing on the aircraft.

In various embodiments, the ice detector apparatus 100 is thus able to differentiate between different icing conditions (in addition to merely detecting the presence of ice). Said differently, a controller 130 may include a processor configured to perform one or more algorithms to differentiate icing conditions. By distinguishing different icing conditions, the controller 130 of the aircraft is configured to indicate to a pilot or automatically undertake actions to address the dynamic icing conditions of the aircraft. For example, and as described in greater detail below with reference to FIGS. 6 and 7, in response to determining the flight operating condition of the aircraft is in the appendix O icing-envelope, the trajectory of the aircraft may be changed to remove the aircraft from the appendix O icing-envelope and/or supplementary de-icing systems, methods, and protocols may be implemented to address the elevated icing conditions.

With continued reference to FIG. 2, controller 130 may be operably coupled in electronic communication with the heater strip 110 and the temperature sensors 120. The controller 130 may be integrated into computer systems onboard aircraft such as, for example, a full authority digital engine control (FADEC), an engine-indicating and crew-alerting system (EICAS), and/or the like. The controller 130 may also be a standalone computer system separate from aircraft and in electronic communication with aircraft, as described in further detail herein. The controller 130 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor of the controller 130 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The controller 130 may be configured to perform various operations. For example, the method steps described below with reference to FIGS. 5, 6, and 7 may be performed by the controller 130. Generally, the controller 130 is configured to receive the temperature profile from the temperature sensors 120 and to determine the icing condition of the aircraft (e.g., to determine whether a flight operating condition of the aircraft is in an appendix C icing-envelope or an appendix O icing-envelope).

In various embodiments, and with continued reference to FIG. 2, the heater strip 110 comprises a carbon allotrope heater or metallic heater. For example, the heater strip 110 may include a carbon nanotube heater. Carbon or metal materials may be well-suited for the heater strip 110 because carbon materials may withstand the temperatures involved, may conform to the geometry of the external surface 105 of the aircraft to which the heater strip 110 is to be mounted, and may have low thermal inertia (i.e., fast response time). In various embodiments, an electrically insulative and/or a thermally insulative material is disposed between the heater strip 110 and the surface 105 of the aircraft. In various embodiments, the heater element is a "running wet" or "totally evaporative" anti-icing heater (or a hybrid of both), depending on the severity of icing conditions.

In various embodiments, the ice detector apparatus 100 includes a plurality of temperature sensors 120 coupled to and disposed along a length of the heater strip 110. As used in this context only, the term "coupled to" may refer to standalone, separate temperature sensors that are operably connected to the heater strip to sense/detect temperatures of the heater strip 110 along its length, or the term "coupled to" may refer to temperature sensors that are integrated into the heater strip 110. In various embodiments, the temperature sensors 120 are resistance thermometers (e.g., resistance temperature detectors) and/or fiber optical temperature sensors. The temperature sensors 120 are generally configured to sense a temperature profile, as a function of distance along/across the heater strip 110. That is, the detected temperature profile may be a spatial temperature map of the heater strip 110.

In various embodiments, and with continued reference to FIG. 2, the ice detector apparatus 100 may be mounted to a leading edge 106 of a structure of the aircraft 10. For example, and with reference to FIG. 1, the ice detector apparatus 100 may be mounted to leading edge 6A of the wings, the leading edge 6B of the tail/vertical stabilizer, the leading edge 6C of the horizontal stabilizer, and/or the leading edge 6D of the engine case inlet, among others. That is, the heater strip 110 may extend around the leading edge 106 of an aircraft structure such that a first end 111 of the heater strip 110 is disposed on a first side 101 of the aircraft structure and a second end 112 (not shown in FIG. 2, see FIGS. 3B, 3D, and 3F) of the heater strip 110 is disposed on a second side 102 of the aircraft structure. The first side 101 may be opposite the second side 102 such that the first side 101 and the second side 102 meet at the leading edge 106. By positioning the heater strip 110 in this manner, the extent of impingement of water/ice from the leading edge along the first and second sides 111, 112 of the aircraft structure can be determined using the plurality of temperature sensors 120. That is, the temperature profile (e.g., the spatial temperature map) of the heater strip 110 provides information pertaining to how far back from the leading edge 106 the water/ice reaches, thereby indicating the icing condition of the aircraft.

Figure 3A:
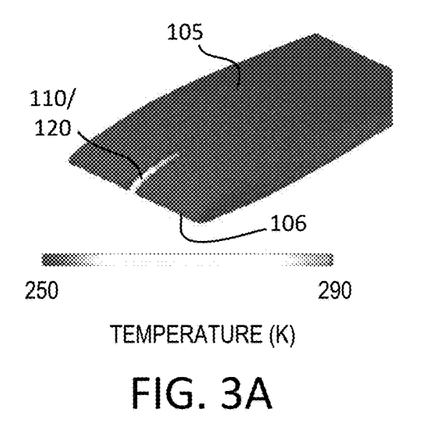
FIGS. 3A and 3B illustrate an ice detector apparatus with a temperature profile indicating a dry flight operating condition, in accordance with various embodiments.
Figure 3B:
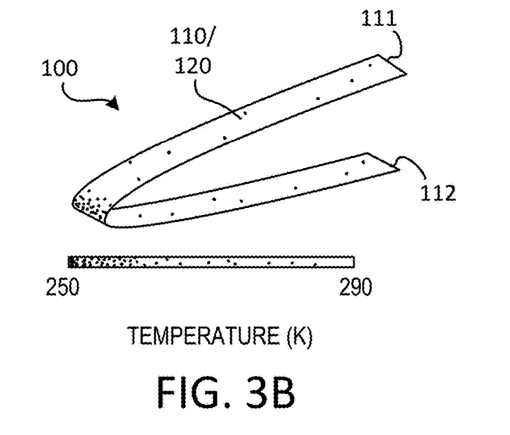
Figure 3C:
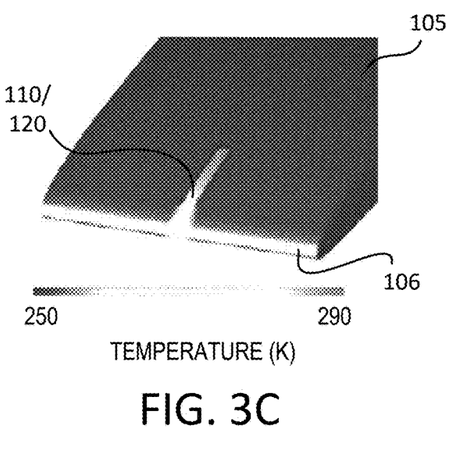
FIGS. 3C and 3D illustrate an ice detector apparatus with a temperature profile indicating a flight operating condition in an appendix C icing-envelope, in accordance with various embodiments.
Figure 3D:
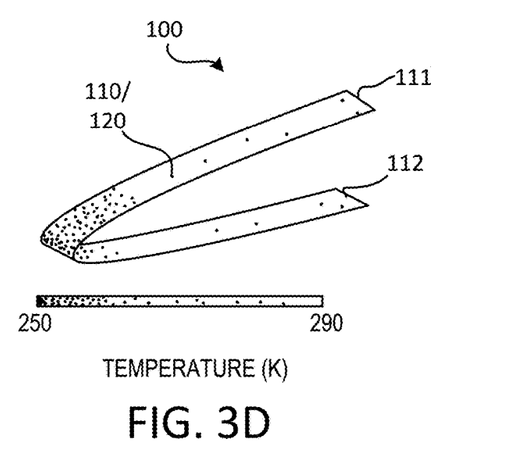
Figure 3E:
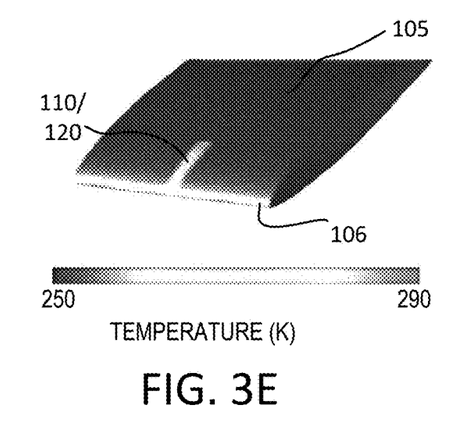
FIGS. 3E and 3F illustrate an ice detector apparatus with a temperature profile indicating a flight operating condition in an appendix O icing-envelope, in accordance with various embodiments.
Figure 3F:
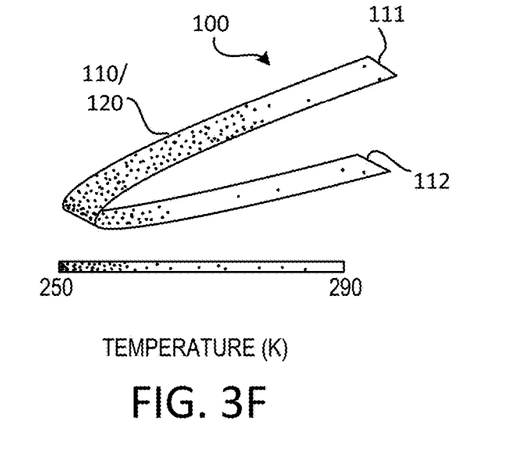

In various embodiments, and with reference to FIGS. 3A, 3B, 3C, 3D, 3E, and 3F, examples of various temperature profiles of the heater strip 110 are provided. FIGS. 3A and 3B illustrate the ice detector apparatus with a temperature profile (i.e., spatial temperature map) indicating a dry flight operating condition, in accordance with various embodiments. FIGS. 3C and 3D illustrate the ice detector apparatus with a temperature profile indicating a flight operating condition in an appendix C icing-envelope, in accordance with various embodiments. FIGS. 3E and 3F illustrate the ice detector apparatus with a temperature profile/signature indicating a flight operating condition in an appendix O icing-envelope, in accordance with various embodiments. In each of these conditions, the first and second ends 111, 112 of the heater strip 110 have the highest temperature (relative to the rest of the length of the heater strip 110), with a "colder middle portion," disposed at or near the leading edge, having lower temperatures. As can be seen in the progression from dry flight in FIG. 3B to appendix C icing-conditions in FIG. 3D and finally to appendix O icing-conditions in FIG. 3F, the dimensions of the colder middle portion increase. That is, the increasing size of the colder middle portion of the heater strip 110 represents a greater extent of icing present on the aircraft. Thus, the icing condition of the aircraft can be determined based on the spatial temperature map of the heater strip. That is, the size of the water droplets in the air surrounding the aircraft (and more generally the water content in the air surrounding aircraft) affects the rate at which heat is drawn from the heater strip 110 (e.g., the heat flux) draws heat from the heater strip 110.

Figure 4:
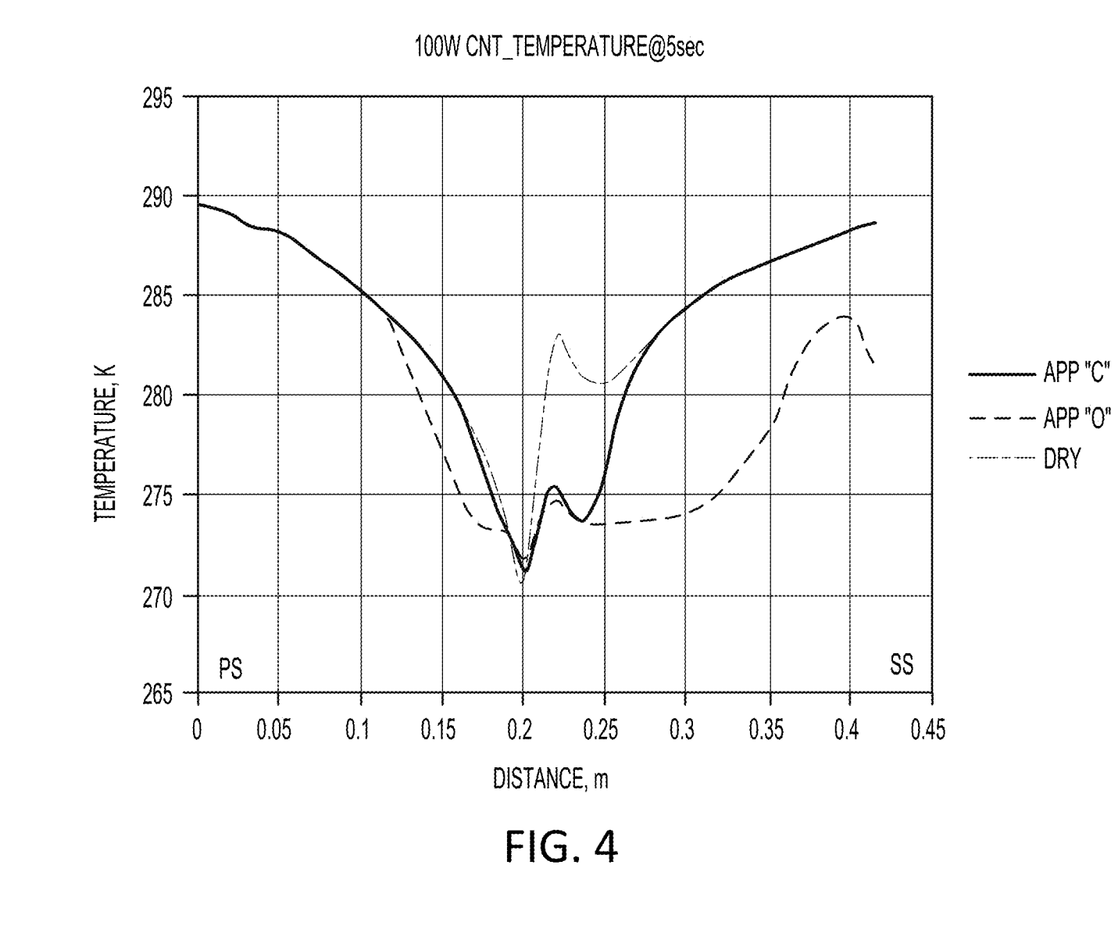
FIG. 4 is a graph showing different temperature profiles indicating different flight operating conditions, in accordance with various embodiments.

In various embodiments, and with reference to FIG. 4, these spatial temperature maps of the three conditions (dry, appendix C icing-envelope, and appendix O icing-envelope) are shown. As is evident from FIG. 4, the dry condition has a narrow low temperature region, the appendix C icing-envelope has a wider low temperature region, and the appendix O icing-envelope has the widest low temperature region (e.g., a larger portion of the heater strip is colder).

Said differently, different icing conditions have different thermal heat signatures as a function of distance along the heater strip.

Figure 5:
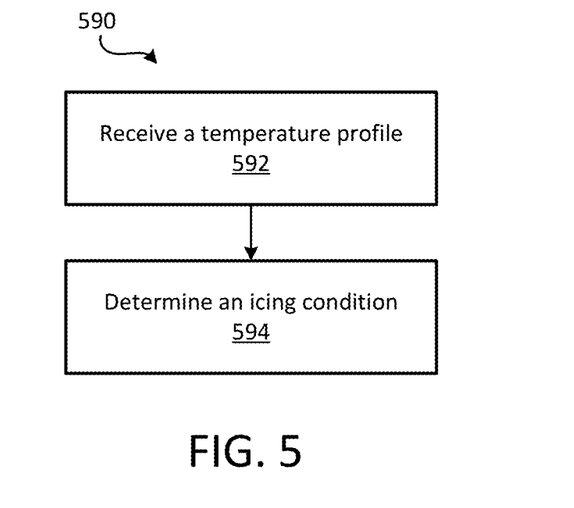
FIGS. 5, 6, and 7 are schematic flow chart diagrams of ice detection methods, in accordance with various embodiments.

In various embodiments, and with reference to FIG. 5 an ice detection method 590 is provided. The method 590 includes receiving, by a controller, a temperature profile from a temperature sensor coupled to a heater strip mounted to a surface of the aircraft at step 592. The method 590 further includes determining an icing condition at step 594. Step 594 may include determining, by the controller and based on the temperature profile, whether the aircraft is in dry air, or whether a flight operating condition of the aircraft is in an appendix C icing-envelope or an appendix O icing-envelope.

Figure 6:
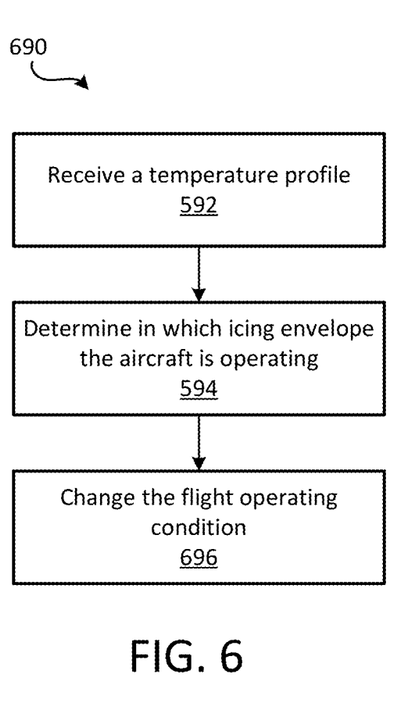

In various embodiments, and with reference to FIG. 6, the ice detection method 690 may include steps 592 and 594, as well as additional step 696. Step 696 may include changing the flight operating condition (based on the determined icing condition from step 594). That is, step 696 may include, in response to determining the flight operating condition of the aircraft is in the appendix O icing-envelope, changing, by the controller, the flight operating condition to remove the aircraft from the appendix O icing-envelope.

Figure 7:
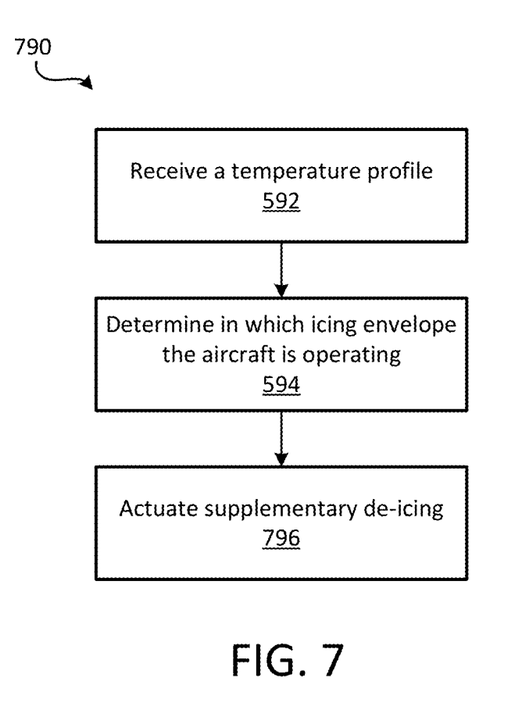

In various embodiments, and with reference to FIG. 7, the ice detection method 790 may include steps 592 and 594, as well as additional step 796. Step 796 may include actuating supplementary deicing (based on the determined icing condition from step 594). That is, step 796 may include, in response to determining the flight operating condition of the aircraft is in the appendix O icing-envelope, actuating supplementary deicing in order to manage the increased icing conditions present while the aircraft is in the appendix O icing-envelope.

In various embodiments, step 594 includes determining, by the controller, a spatial temperature map of the heater strip. Additional step 594 may include determining, by the controller, at least one of a size of water droplets in air around the aircraft and/or a water content of the air around the aircraft. In various embodiments, step 594 includes determining, by the controller, a heat flux of the heater strip. The method may further include controlling, by the controller, the heater strip.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An ice detector apparatus for an aircraft, the ice detector apparatus comprising:

a heater strip configured to be mounted to a surface; a plurality of temperature sensors coupled along a length of the heater strip, wherein the plurality of temperature sensors is configured to detect a temperature profile comprising a spatial temperature map of the heater strip, and a controller in electronic communication with the heater strip and the plurality of temperature sensors, the controller being configured to determine a size of a colder middle portion of the heater strip using the spatial temperature map and determine an extent of icing based on the size of the colder middle portion, wherein the colder middle portion is disposed at or near a leading edge of a structure of the aircraft.

2. The ice detector apparatus of claim 1, wherein the surface is an external surface of an aircraft, and wherein the controller is configured to determine whether the aircraft is operating in an appendix C icing-envelope or an appendix O icing-envelope based on the size of the colder middle portion.

3. The ice detector apparatus of claim 1, wherein the heater strip is configured to extend around the leading edge such that a first end of the heater strip is disposed on a first side of the structure and a second end of the heater strip is disposed on a second side of the structure, wherein the first side is opposite the second side and the first side meets the second side at the leading edge.

4. The ice detector apparatus of claim 1, wherein the heater strip comprises a carbon nanotube heater.

5. The ice detector apparatus of claim 1, wherein the temperature sensors comprise a resistance temperature detector.

6. An aircraft comprising:
a heater strip mounted to a surface of the aircraft;
a plurality of temperature sensors coupled along a length of the heater strip, wherein the plurality of temperature sensors is configured to detect a temperature profile comprising a spatial temperature map of the heater strip; and
a controller operably coupled in electronic communication with the heater strip and the plurality of temperature sensor, the controller comprising a processor, wherein a tangible, non-transitory memory is configured to communicate with the processor, wherein the tangible, non-transitory memory has instructions stored thereon that, in response to execution by the processor, cause the aircraft to perform operations comprising:
determining, based on the temperature profile a size of a colder middle portion, whether a flight operating condition of the aircraft is in an appendix C icing-envelope or an appendix O icing-envelope.

7. The aircraft of claim 6, wherein the operations further comprise, in response to determining the flight operating condition of the aircraft is in the appendix O icing-envelope, changing the flight operating condition to remove the aircraft from the appendix O icing-envelope.

8. The aircraft of claim 6, wherein the operations further comprise, in response to determining the flight operating condition of the aircraft is in the appendix O icing-envelope, actuating supplementary de-icing.

9. The aircraft of claim 6, wherein the structure comprises at least one of a wing, a tail, a horizontal stabilizer, and an inlet engine case.

10. The aircraft of claim 6, wherein the heater strip extends around the leading edge such that a first end of the heater strip is disposed on a first side of the structure and a second end of the heater strip is disposed on a second side of the structure, wherein the first side is opposite the second side and the first side meets the second side at the leading edge.

11. The aircraft of claim 6, further comprising at least one of an electrically insulative and a thermally insulative material disposed between the heater strip and the surface of the aircraft.

12. An ice detection method of an aircraft, the method comprising:
receiving, by a controller, a temperature profile from a plurality of temperature sensors coupled along a length of a heater strip mounted to an external surface of the aircraft,
wherein the temperature profile comprises a spatial temperature map of the heater strip; and
determining, by the controller and based on the temperature profile, whether a flight operating condition of the aircraft is in an appendix C icing-envelope or an appendix O icing-envelope, wherein a size of a colder middle portion of the heater strip is indicative of the flight operating condition.

13. The method of claim 12, further comprising, in response to determining the flight operating condition of the aircraft is in the appendix O icing-envelope, changing, by the controller, the flight operating condition to remove the aircraft from the appendix O icing-envelope.

14. The method of claim 12, further comprising, in response to determining the flight operating condition of the aircraft is in the appendix O icing-envelope, actuating, by the controller, supplementary de-icing.

15. The method of claim 12, wherein determining whether the flight operating condition of the aircraft is in the appendix C icing-envelope or the appendix O icing-envelope comprises determining, by the controller, at least one of a size of water droplets in air around the aircraft and a water content of the air around the aircraft.

16. The method of claim 12, wherein determining whether the flight operating condition of the aircraft is in the appendix C icing-envelope or the appendix O icing-envelope comprises determining, by the controller, a heat flux of the heater strip.

17. The method of claim 12, further comprising controlling, by the controller, the heater strip.

* * * * *

UNITED STATES PATENT AND TRADEMARK OFFICE
CERTIFICATE OF CORRECTION

| | |
|---|---|
| PATENT NO. | : 11,618,575 B2 |
| APPLICATION NO. | : 16/509078 |
| DATED | : April 4, 2023 |
| INVENTOR(S) | : Galdemir Cezar Botura |

It is certified that error appears in the above-identified patent and that said Letters Patent is hereby corrected as shown below:

In the Claims

Claim 6, Column 9, Line 37 after the word "temperature" please delete the word "sensor" and insert --sensors--

Signed and Sealed this
First Day of August, 2023

Katherine Kelly Vidal
*Director of the United States Patent and Trademark Office*